Nov. 14, 1967 H. W. BOOTHROYD ETAL 3,352,163
CONSTANT DAMPING GYRO SYSTEM
Filed Oct. 24, 1963 2 Sheets-Sheet 1
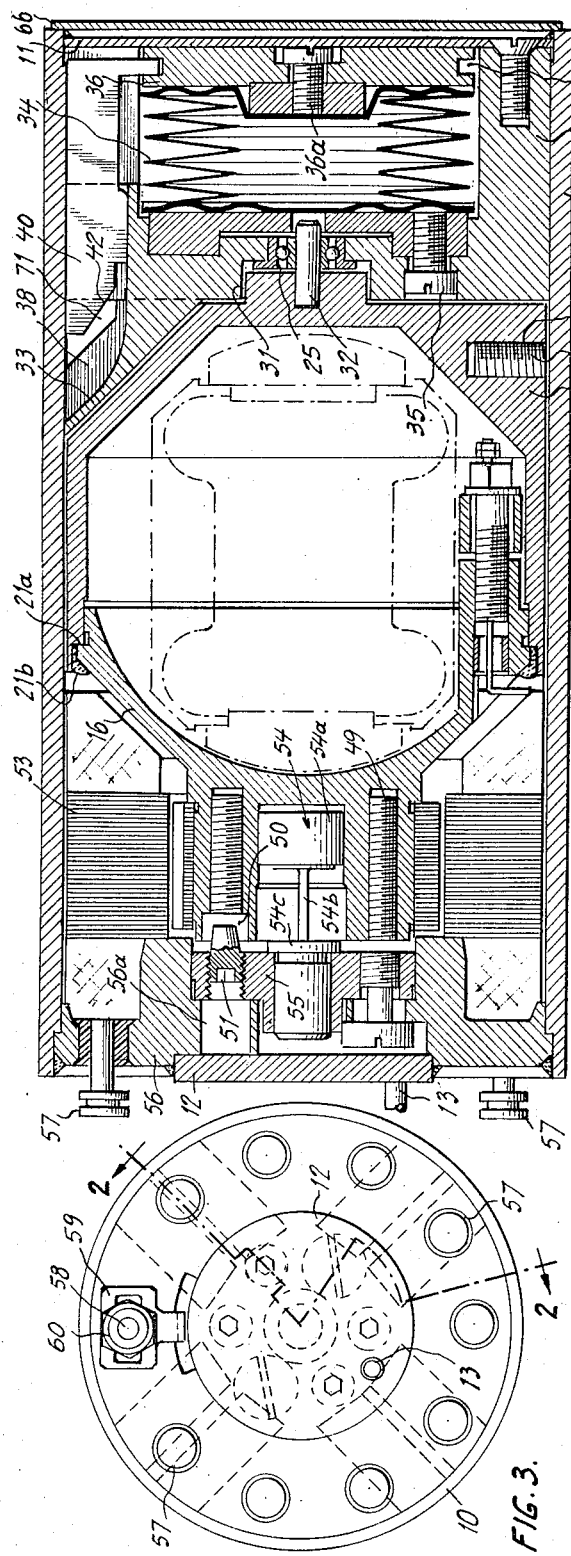
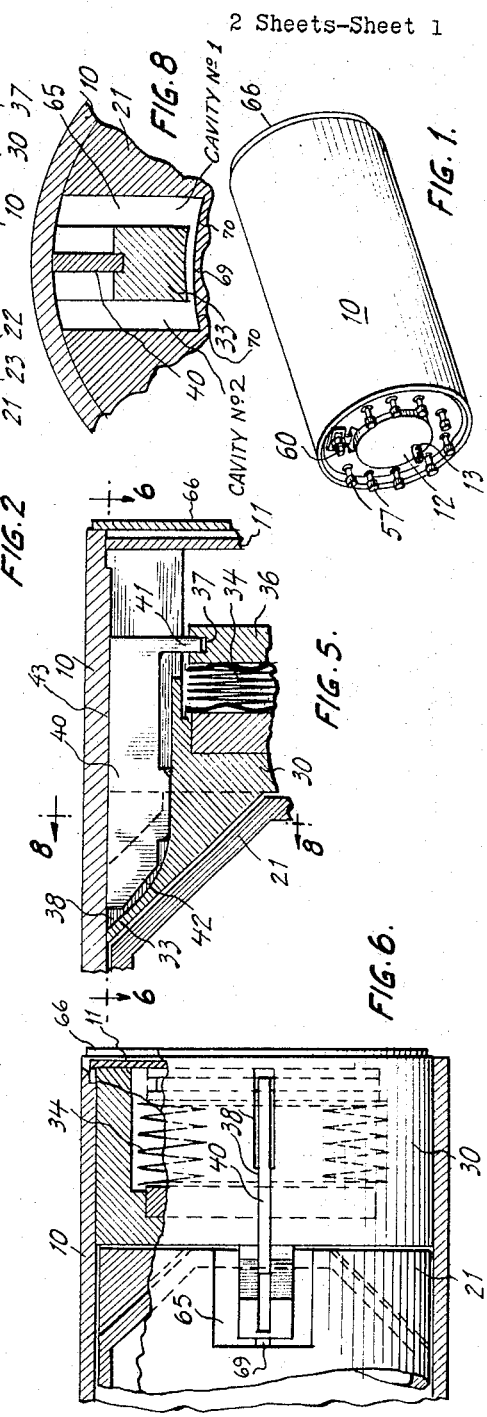
INVENTORS.
HOWARD W. BOOTHROYD
HARRY E. FERRY
JAMES M. BUZZELL
THOMAS W. NACHAZEL
BY
ATTORNEY

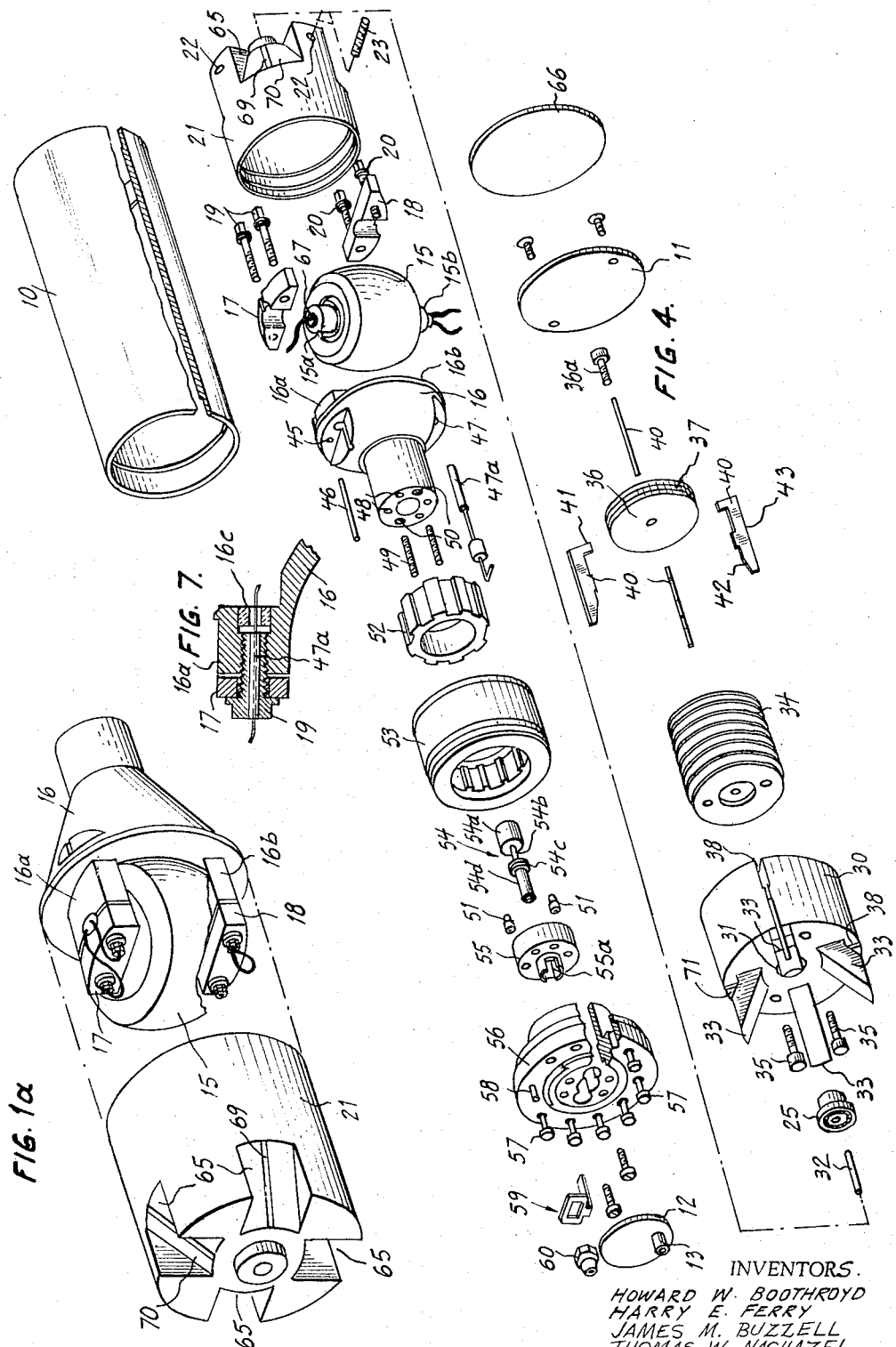

United States Patent Office 3,352,163
Patented Nov. 14, 1967

3,352,163
CONSTANT DAMPING GYRO SYSTEM
Howard W. Boothroyd, Amherst, Harry E. Ferry, Nashua, and James M. Buzzell, Northwood, N.H., and Thomas W. Nachazel, Chelmsford, Mass., assignors to Sanders Associates, Inc., Nashua, N.H., a corporation of Delaware
Filed Oct. 24, 1963, Ser. No. 318,610
11 Claims. (Cl. 74—5.5)

This invention relates to gyros and more particularly to fluid damped rate gyros.

In such instruments, the gyro wheel is mounted in a gimbal system so as to have only one degree of freedom, and the spin axis is so oriented that rotation about the input axis causes the gyro to develop a torque, producing rotation of the gimbal about its single axis of freedom. Such rotation is opposed by resilient action, to give a quantitative indication of the action to be measured.

Rotation of the gimbal about its axis of freedom, as above mentioned, is damped by fluid, more particularly liquid, and the damping liquid separates the gimbal assembly from the outer housing by a small space, of the order of 0.007 inch, thereby providing relatively high shock protection for the gyro mechanism, even with preferred low viscosity damping liquid.

It has been found that changes in temperature cause changes in the damping, due to changes in viscosity of the liquid with temperature, which in turn affect the readings obtained. Accordingly, it is desirable to provide a damping system affording constant damping within wide variations of temperature.

Among the objects of this invention are:

To provide an improved gimbal system and mounting which is economical of space within the housing, thereby minimizing weight and space required by the entire assembly;

To provide such an assembly which is relatively inexpensive to manufacture and assemble;

To provide such an assembly which enables the motor to be readily replaced or repaired without damage to the gimbal system or the motor;

To provide such an assembly affording an improved hermetic seal protecting the motor;

To provide an improved arrangement for admitting the several motor leads out of the motor-gyro unit to the exterior of the gimbal, while maintaining the hermetic seal;

To provide such an assembly which functions in combination with the damping system to afford constant damping over a relatively wide range of temperature, and improved shock resistance;

To provide a damping control system having a plurality of movable gates which very the effective size of the liquid flow apertures to maintain constant damping; and To provide a damping system in which the movable parts have relatively small mass, and in which the paths of flow of the dampening liquid via the flow apertures are minimum, thereby providing minimum time delay in compensating for changes in temperature.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which:

FIG. 1 is a perspective side view of a gyroscope embodying the present invention, FIG. 1a is a perspective view of the gimbal assembly, FIG. 2 is an enlarged view, partly in section, on lines 2—2 of FIG. 3, FIG. 3 is an end view of the gyro in accordance with our invention, FIG. 4 is an exploded perspective view of the gyro shown in FIGS. 1 and 2, FIG. 5 is a detail diagrammatic view showing one movable gate for maintaining constant damping, FIG. 6 is a similar view, partly in section, on lines 6—6 of FIG. 5, FIG. 7 is a detail of the motor lead seal, and FIG. 8 is a detail section on lines 8—8 of FIG. 5.

Referring now more particularly to FIG. 1, 10 designates the cylindrical housing shown partly broken away in FIG. 4, having rear cover plate 11, rear name plate 66, and front end cap and cover plate 12, the latter carrying a projecting filler tube 13, through which damping liquid may be introduced into or removed from housing 10. This housing contains the gyro, the gimbal system, the torsion bar, the pick-off rotor and stator, and other parts as will be described.

The motor-gyro unit 15, having shaft 67 with bearing preload nuts 15a and 15b, respectively at the top and bottom, is mounted on the forward gimbal section 16 provided with upper and lower pillow blocks 16a and 16b formed to receive the upper and lower bearing preload nuts 15a and 15b. The motor-gyro unit 15 is secured to the forward gimbal section 16 by top and bottom bearing caps 17 and 18, each fastened in position by bearing cap bolts 19 and 20, engaging the pillow blocks 16a and 16b respectively.

Bearing cap bolts 19 and 20 are preferably hollow, as shown in FIG. 7, to permit passage of the motor leads from the outside to the inside of the gimbal, and the outer side of the forward gimbal section 16 is provided with a glass seal 16c soldered into the gimbal, through which the motor lead passes. The glass feed-through soldered into the hole in the gimbal forms a hermetic seal, while still permitting passage of the motor lead into the gimbal. While only one is shown in FIG. 7, it will be understood that such a construction is preferably employed to bring each of the motor leads into interior of the gimbal.

The forward gimbal section 16, with the motor-gyro unit attached, is inserted by press fit a short distance into the rear gimbal section 21, to abut against inner locating cylindrical stop 21a, and the joint between the forward gimbal section 16 and the rear gimbal section 21 is preferably solder sealed as at 21b (FIG. 2), so that the entire gimbal unit is hermetically sealed.

The rear gimbal section 21 is provided with four tapped holes 22 to receive balance screws 23, by the adjustment of which the system may be roughly balanced to eliminate the error effects of linear acceleration on the output signals of the system.

The rear gimbal section 21 rotates in ball bearing assembly 25 surrounding pivot pin 32 to permit rotation of the gimbal system. The outer end of rear gimbal section 21 is provided with four inwardly extending cut-outs 65 spaced 90° apart circumferentially.

The inclined surface of cut-outs 65 is frustoconical, except for a central flat portion 69 provided for clearance to permit rotation of the gimbal with respect to the paddle block 30, and prevent binding.

Adjacent the outer end of rear gimbal section 21, and fixed to housing 10, there is mounted a hollow cylindrical paddle block 30 having a central opening 31. The forward end of paddle block 30 is provided with four outwardly inclined arms 33 which register with the four cut-outs 65 in the outer end of rear gimbal section 21. The cut-outs have a flat portion 69 to provide a close fit with arm 33.

The slope surfaces 70 provide clearance for arms 33 when the assembly rotates.

Mounted within the paddle block is sealed bellows 34, having its forward end secured to the rear face of the paddle block 30 by screws 35. Secured to the rear (free) end of bellows 34 by screw 36a is cylindrical guide plate 36, having a circumferentially extending groove 37. The paddle block 30 is provided with four longitudinally extending slots 38, spaced 90° apart circumferentially, each along the center line of each outwardly extending arm 33, respectively.

Four sliding gates 40 are provided, each gate having a straight edge 43, and cut off on the inner forward end at an angle at 42, and having at its rear end an inwardly extending projection 41 (FIG. 4). One gate is inserted in each slot 38, with projection 41 riding in the cylindrical groove 37 of guide plate 36 (FIG. 2). The length of the gates is so chosen that when the bellows 34 is collapsed, the gates move forwardly, to completely close apertures 71 in arms 33 and as the bellows expands, it carries the gates in a direction away from arms 33 such that apertures are gradually opened.

Bellows 34 is sealed, and is immersed in the damping liquid within housing 10, and it will be understood that as the volume of the damping fluid is increased, due to increase in temperature, the bellows moves in a direction to collapse, moving the gates 40 toward arms 33, thereby reducing or closing the aperture 71 through which the damping liquid can flow, and increasing the damping action.

How this occurs will now be explained. The clearance between arms 33 on the paddle block 30 and the sides of cut-outs 65 leaves cavities numbers 1 and 2 on each side of arms 33 (FIG. 8). The undercutting of arms 33 on the outside adjacent to the paddle block 30 forms apertures 71 through which liquid can flow between cavities numbers 1 and 2 when the bellows is expanded and the gates are open. This provides minimum damping at low temperatures when the volume of liquid is a minimum. As the temperature increases, the liquid expands, the bellows moves in a direction to collapse, moving gates 40 toward arms 33, thereby reducing and finally closing apertures 71, preventing flow of liquid between cavities numbers 1 and 2 and providing maximum damping for rotation of the gimbal. As the volume of the damping liquid decreases, due to drop in temperature, the reverse action occurs. This action will be clear from FIGS. 5 and 6. Volumetric changes of the damping liquid are directly proportional to temperature changes. The constants of the bellows assembly, the arms 33, the walls of cut-outs 65, the flat portion 69, and elements which determine the size of the apertures 71 are selected so that the damping ratio remains constant regardless of temperature.

Referring now more particularly to FIG. 4, the forward gimbal section 16 is provided with an opening 45 to which is attached an evacuation tube 46, by means of which the interior of the gimbal assembly may be evacuated after the forward gimbal section 16 and rear gimbal section 21 are assembled and sealed. Similarly, openings 47 are provided for bringing out the motor leads, these being provided with insulating sleeves 47a where they pass through the forward gimbal section 16, as already described.

The forward face of the forward gimbal section 16 is preferably provided with a series of tapped holes 48 for receiving balancing set screws 49, the number of which may be chosen to fit particular conditions. There may be none, or up to several, and off-center counterbored holes 50 may be provided to receive stop screws 51. These screws may be adjusted through holes 56a in end cap 56 and are located and secured in torsion plate 55.

Pick-off rotor 52 is secured around the neck portion of forward gimbal section 16 to rotate therewith, within pick-off stator 53, and, since the pick-off system per se is well known, no further description of it is believed necessary. The input and output windings which surround the stator poles have been omitted from FIG. 4.

In pick-off systems of the type used herein, rotation of the gimbal assembly is ordinarily not substantially more than 3° in either direction from central position. To assure this, stop pins 51 are provided, which are limited in motion by the wall of the counterbored holes 50. Resilient action against rotation is provided by the torsion bar 54. This consists of cylindrical plug 54a which fits the central hole in the forward face of forward gimbal section 16, has a much reduced torsion portion 54b terminating in collar 54c, and has an extension 54d, tapped to receive a screw (not shown) to secure it to torsion plate 55 having a central opening 55a to receive extension 54d.

The torsion bar 54 and torsion plate assembly are fitted within a central depression in the rear face of front end cap 56. The pick-off stator 53 is bonded directly to the front end cap and carries a series of insulated terminals 57 passing through the end cap 56 by which connections are made to the primary and secondary coils surrounding the poles of the pick-off stator and to the motor (FIG. 2).

The front end cap 56 also carries null adjusting screw 58, and fine null adjust plate 59 and nut 60 for securing the fine null adjust plate in position. This feature is not per se a part of the invention claimed herein, but is covered in a separate application assigned to the assignee of this application.

In the foregoing, we have described certain preferred embodiments of our invention, and the best mode presently known to us for practicing it, but it should be understood that modifications and changes may be made without departing from the spirit and scope of our invention.

We claim:

1. In a fluid damped gyro system having a motor-gyro unit sealed within a gimbal and mounted for rotation within a housing containing damping liquid, and having means for maintaining substantially constant damping in said system for variations of temperature, said means comprising:
   (a) a paddle block secured within said housing at one end of said gimbal, and having a plurality of outwardly inclined arms at the end adjacent said gimbal, said arms in conjunction with said housing forming apertures for the flow of damping fluid,
   (b) said gimbal having a plurality of circumferentially spaced cut-outs to receive said arms, said cut-outs being wider than said arms and forming a pair of fluid cavities at each side of said arms, and permitting limited rotation of said gimbal,
   (c) a plurality of gates longitudinally movable within said apertures for varying the sizes of said apertures, said gates being movable away from said gimbal to cause an increase in the size of said aperatures, and
   (d) means within said housing responsive to volume change in the damping fluid for moving said gates to vary the area of said apertures.

2. The combination claimed in claim 1 in which said apertures are formed by the inside of said housing and the outside of said arms.

3. The combination claimed in claim 1 in which said arms are outside the gyro rotor and physically overlap a portion thereof.

4. The combination claimed in claim 1 in which said gates in fully closed position still leave a passage for limited fluid flow between adjacent cavities, thereby preventing the formation of fluid-tight cavities.

5. The combination claimed in claim 1 in which the outer face of said cut-outs is generally frusto-conical.

6. The combination claimed in claim 1, in which the outer face of said cut-outs is generally frusto-conical, having a flat portion extending longitudinally of said cut-out and centrally positioned circumferentially in said cut-out.

7. In a gyro system, in combination,
   (a) a gimbal,
   (b) a motor-gyro unit mounted in said gimbal,
   (c) said gimbal having bearing caps for securing said motor-gyro unit, and bearing cap bolts for securing said bearings caps in position, (d) said bearing cap bolts and said gimbal having an opening from the inside to the outside of said gimbal,
(e) a lead passing through said opening, and
(f) a glass feed-through surrounding said lead and forming a hermetic seal in said gimbal opening.

8. The combination claimed in claim 1 in which said gates are duplicate strips.

9. The combination claimed in claim 1 in which said gates are duplicate interchangeable strips.

10. The combination claimed in claim 1 in which said means responsive to volume change is a bellows having one end secured to one face of said paddle block.

11. The combination claimed in claim 1 in which said means responsive to volume change is a bellows having one end secured to said paddle block and a guide plate secured to the free end of said bellows, said guide plate having a circumferential groove, and said gates each having a depending end portion disposed within said groove.

References Cited
UNITED STATES PATENTS

| | | | |
|---|---|---|---|
| 3,132,524 | 5/1964 | Krupick et al. | 74—5.5 |
| 3,225,607 | 12/1965 | Schaberg et al. | 74—5 |

FRED C. MATTERN, Jr., *Primary Examiner.*

PALMER W. SULLIVAN, *Examiner.*

J. D. PUFFER, C. J. HUSAR, *Assistant Examiners.*